(12) United States Patent
Priest

(10) Patent No.: US 6,841,897 B2
(45) Date of Patent: Jan. 11, 2005

(54) INPUT POWER SHARING

(75) Inventor: Joel F. Priest, Raleigh, NC (US)

(73) Assignee: ADC DSL Systems, Inc., Eden Prairie, MN (US)

(*) Notice: Subject to any disclaimer, the term of this patent is extended or adjusted under 35 U.S.C. 154(b) by 222 days.

(21) Appl. No.: 10/162,165

(22) Filed: Jun. 3, 2002

(65) Prior Publication Data
US 2003/0222504 A1 Dec. 4, 2003

(51) Int. Cl.[7] ................................................ H02J 1/10
(52) U.S. Cl. ......................................... 307/52; 307/82
(58) Field of Search .............................. 307/52, 53, 58, 307/62, 69, 80, 81, 82

(56) References Cited

U.S. PATENT DOCUMENTS 5,552,643 A * 9/1996 Morgan et al. ............... 307/81

6,459,171 B1 * 10/2002 Leifer ........................ 307/52

OTHER PUBLICATIONS

McNeill, John, "Boost Converter Provides Temperature-Controlled Operation of 12V Fan from +5V Supply", Electronic Design Magazine, pp. 98–100, Dec. 18, 1997.

* cited by examiner

Primary Examiner—Jessica Han
(74) Attorney, Agent, or Firm—Fogg and Associates, LLC; Laura A. Ryan

(57) ABSTRACT

An input power sharing control circuit is provided. The control circuit includes a plurality of current limiting circuits each circuit adapted to receive power from one of a plurality of independent power sources, a power switching control circuit adapted to receive power from the plurality of independent power sources and provide a variable power output and a load coupled to the output of the power switching control circuit, wherein the value of the load impedance and the value of the voltage of the output power controls the variable power output.

53 Claims, 5 Drawing Sheets

INPUT POWER SHARING

TECHNICAL FIELD

The present invention relates generally to the field of electronic circuits and, in particular, to input power sharing.

BACKGROUND

With the improvements in technology and in particular the demands for information, the need for power is ever increasing. Many types of electronics equipment are collocated and often this equipment is powered separately. In particular many types of telecommunications equipment are often collocated e.g. repeater housings, service units, chassis, and etc. Power provided for the collocated equipment may originate from the same or different sources. For example remote units can be line powered from the central office. In many situations power is not only needed to run the telecommunications equipment but to provide power for other services such as monitoring, fault detection, cooling, life line services, and the like. With the increasing demand for data and limitations on power from central offices there is often insufficient power available to provide additional services by a single piece of equipment. In these types of situations any excess power is often unused or unavailable.

For the reasons stated above, and for other reasons stated below which will become apparent to those skilled in the art upon reading and understanding the present specification, there is a need in the art for a technique to provide input power sharing.

SUMMARY

The above-mentioned problems with power sharing and other problems are addressed by embodiments of the present invention and will be understood by reading and studying the following specification. Specifically, embodiments of the present invention provide control of input power sharing for electronics equipment.

In one embodiment, an input power sharing control circuit is provided. The control circuit includes a plurality of current limiting circuits each circuit adapted to receive power from one of a plurality of independent power sources, a power switching control circuit adapted to receive power from the plurality of independent power sources and provide a variable power output and a load coupled to the output of the power switching control circuit, wherein the value of the load impedance and the value of the voltage of the output power controls the variable power output.

In another embodiment, an input power sharing control circuit is provided. The circuit includes a plurality of current limiting circuits each circuit adapted to receive a power input from one of a plurality of input power sources. The plurality of input power sources is substantially equal. The circuit further includes a plurality of input filter circuits, each circuit adapted to couple to one of the plurality of current limiting circuits, a power ORing circuit adapted to selectively couple to each of the power inputs and a power switching control circuit coupled to each of the plurality of input filters. The power switching control circuit is adapted to receive power from the power ORing circuit and provide a variable output power. The control circuit further includes a load coupled to the output of the power switching control circuit, wherein the value of the load impedance controls the variable output power.

In an alternate embodiment, a method of input power sharing is provided. The method includes receiving power from multiple input power sources and sharing the combined power from the multiple input power sources and producing a variable output power. Producing a variable output power, comprises controlling the current from each of the multiple input power sources, providing the controlled current to a first source/drain region of a switching transistor, regulating the output power by controlling the on time for the switching transistor based on the controlled current of the multiple input power sources and providing the output power to a functional circuit.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention provide an input power-sharing scheme. Power sharing is accomplished using power-switching circuits. In one embodiment, the power switching control circuit is a discontinuous boost power converter. This power supply topology has the property that the output voltage is equal to or greater than the input voltage minus any circuit voltage losses, e.g. diode voltage drops. In one embodiment, the power switching control circuit is a discontinuous power converter and the power supply topology has the property that the output voltage is less than, equal to or greater than the input voltage. One feature of these power supply topologies is that the current into the power supply is determined by an input inductor or transformer, input voltage and the switching transistor on time. In one embodiment, the switching transistor on time is controlled based on the output voltage and power level by a pulse width modulator circuit and feedback circuitry.

Typically with a discontinuous power converter there is a single input voltage to power the discontinuous power converter. Embodiments of the present invention include multiple input voltages. Advantageously, equipment that is collocated and powered independently benefits from the addition of an input power sharing circuit. An input power sharing circuit will allow the use of power from more than one source to be used collectively to power additional equipment and/or services.

Figure 1:
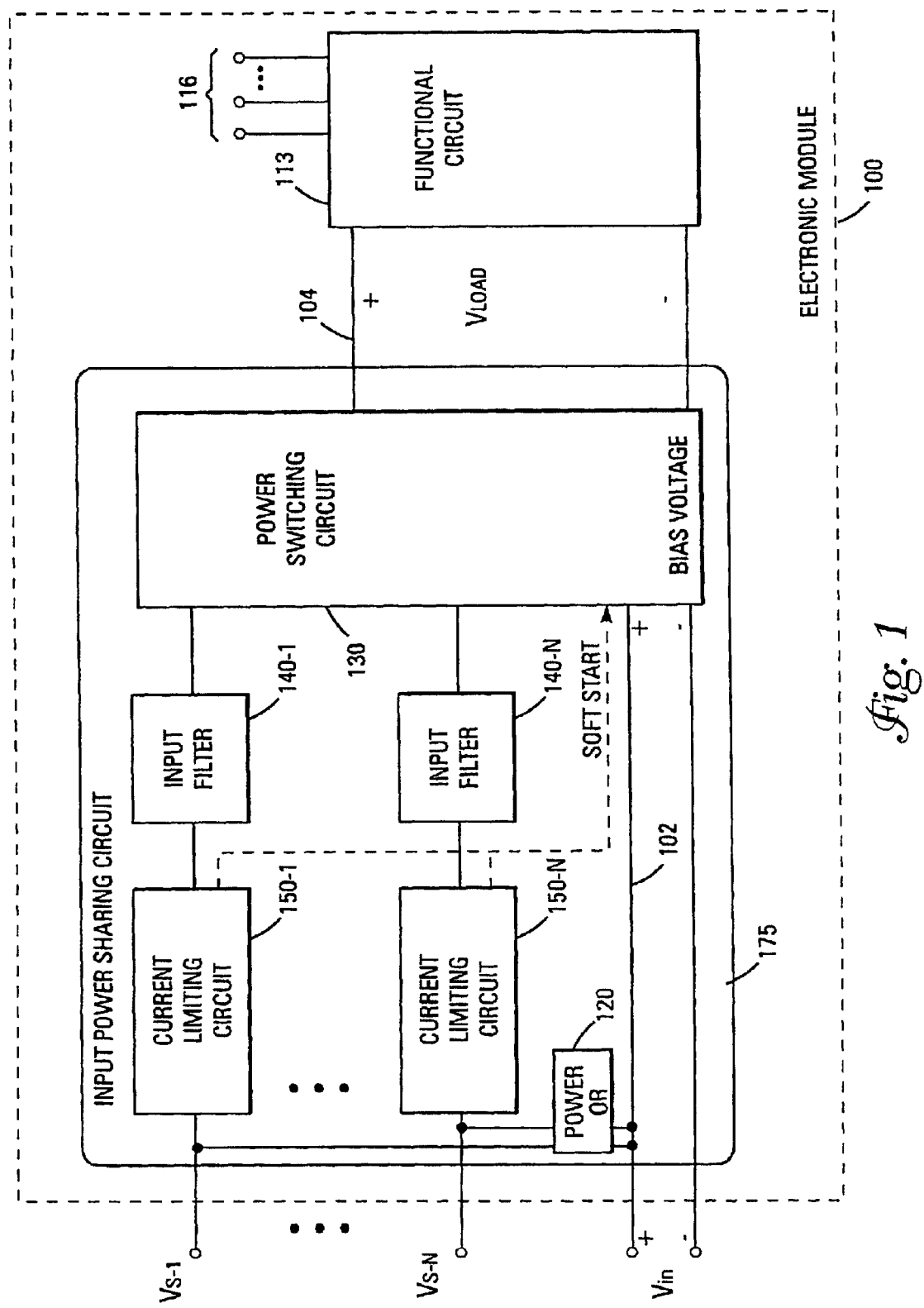
FIG. 1 is a block diagram of one embodiment of an input power sharing circuit according to the teachings of the present invention.

FIG. 1 is a block diagram of one embodiment of the present invention. Electronic module 100 includes an input power sharing circuit 175 and a functional circuit 113. Typically input power sharing circuit 175 and functional circuit 113 are configured on a common circuit board such that electronic module 100 can be inserted into a system such as a chassis. In one embodiment, input power sharing circuit 175 is configured on a board separate from functional circuit 113. Advantageously input power sharing circuit 175 is included in electronic module 100 to enable sharing of power from multiple sources in a common configuration. For clarity in description, the components of electronic module 100 are described in terms of logical interfaces between components. It is understood that these interfaces do not require nor exclude physical interfaces that require one circuit to be selectively plugged into the other circuit. The term is used merely for convenience in description.

Input power sharing circuit 175 includes a power switching control circuit 130 adapted to receive voltage inputs from multiple voltage sources. In one embodiment, power switching control circuit 130 is a discontinuous power switching control circuit, a discontinuous fly back converter or the like. Input power sharing circuit 100 receives inputs $V_{S-1}$ to $V_{S-N}$ from multiple power sources. Each of these inputs $V_{S-1}$ to $V_{S-N}$ are inrush limited by a current limiter 150 and filtered by input filter 140. In one embodiment, input filter 140 is an LC pre-filter and is applied to reduce electro magnetic interference. The output of each filter 140 is coupled to power switching control circuit 130. Advantageously, current limiting circuit 150 provides in rush current protection from the input voltages $V_S$ and provides a soft start control signal to power switching control circuit 130. Input power sharing circuit 175 receives the multiple inputs $V_{S-1}$ to $V_{S-N}$ and shares the combined power to provide an output voltage $V_{LOAD}$ as determined by the load specifications. In one embodiment output voltage $V_{LOAD}$ is greater than any one input $V_S$. Output voltage $V_{LOAD}$ is variable based on the application. $V_{LOAD}$ is provided based on multiple independent power sources and used to power auxiliary equipment.

Input power sharing circuit 175 further includes interface 104 to functional circuit 113. At interface 104, input power sharing circuit 175 provides the output voltage, $V_{LOAD}$, to power functional circuit 113. It is understood that interface 104 is typically a logical interface between input power sharing circuit 175 and functional circuit 113 on a circuit board. Advantageously, current limiting circuit 150 linearly increases the voltage $V_{S-1}$ to $V_{S-N}$ provided to power switching control circuit 130 and in turn the voltage at interface 104 to thereby limit potentially destructive in rush currents when electronic module 100 is plugged into a live system. Current limiting circuits 150-1 to 150-N are each adapted to receive input $V_{S-1}$ to $V_{S-N}$ from multiple power sources of the system. In a system with multiple inputs ($V_{S-1}$ to $V_{S-N}$) current limiting circuits 150-1 to 150-N also protect electronic module 100 from a single point failure such as a short of one of the inputs ($V_S$).

Input power sharing circuit 100 further includes a power ORing circuit 120 adapted to receive power from multiple inputs $V_{S-1}$ to $V_{S-N}$. Power ORing circuit 120 is coupled to power switching control circuit 130 and operates as a logical OR to provide input bias voltage $V_{in}$ when power is received from one or more sources $V_S$. In one embodiment, power ORing circuit 120 includes an ORing diode coupled to each input $V_S$.

Interface 102 couples power ORing circuit 120 to power switching control circuit 130. Interface 102 is adapted to couple to additional circuitry, such as control circuitry, switching circuitry and the like that modifies the voltage input $V_S$ to power switching control circuit 130 based on the particular application. For example the input voltages $V_S$ may exceed the required voltage for a particular functional circuit 113 and additional circuitry is required to regulate the voltage provided to power switching control circuit 130.

Functional circuit 113 receives the output voltage $V_{LOAD}$ of power switching control circuit 130. Voltage set points for powering functional circuit 113 are based on the particular application. This selection of voltages is based on the available voltages from each voltage input source $V_S$ and the electronic specifications of the functional circuit 113. For example, in one embodiment, the functional circuit 113 is a variable speed fan and voltage set points are 9 Volts, 10.5 Volts and 12 Volts. This selection of voltages was chosen based on the available voltages from the line cards or other components and the functional circuit 113 specifictions. Other combinations of voltage levels and power levels are possible, depending on the available voltages and component specifications. In other embodiments, functional circuit 113 comprises any functional circuit for an electronic module that requires power e.g. life line services, monitoring, fault detection and the like. In one embodiment, functional circuit 113 includes additional inputs 116 that communicate with system components. In one embodiment, functional circuit 113 may include the entire system load.

In one embodiment, power switching control circuit 130 is constructed as shown and described below with respect to FIG. 2. In another embodiment, power switching control circuit 130 is constructed as shown and described below with respect to FIG. 3.

Figure 2:
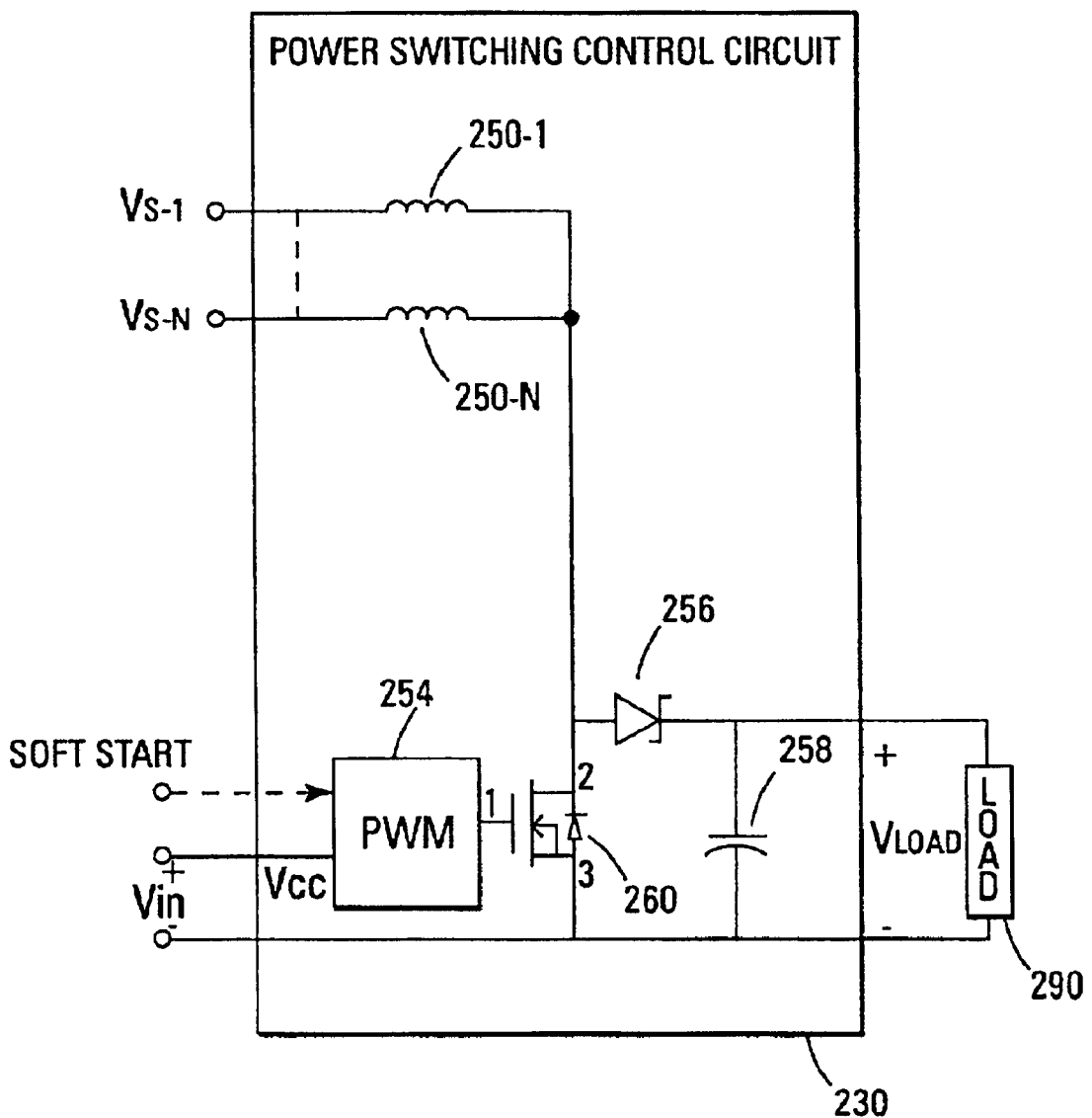
FIG. 2 is a schematic diagram of one embodiment of a power switching control circuit for use in an input power sharing circuit as shown in FIG. 1 according to the teachings of the present invention.

FIG. 2 is a schematic diagram of one embodiment of a power switching control circuit 230 according to the teachings of the present invention. Power switching control circuit 230 is a discontinuous boost converter and includes multiple boost inductors 250-1 to 250-N. Inductors 250 are each coupled to switching transistor 260 and diode 256. Power switching control circuit 230 includes a pulse width modulator (PWM) 254 that acts as a switching regulator and controls switching transistor 260, in turn regulating the output voltage $V_{LOAD}$. In one embodiment, pulse width modulator 254 is a voltage mode pulse width modulator/controller, a current mode pulse width modulator/controller or the like. PWM 254 causes the switching of power transistor 260 at a defined current level in the boost inductors 250. Switching transistor 256 is coupled to a rectifying diode 256. Power switching control circuit 230 includes a capacitor filter 258. In one embodiment, switching transistor 260 is a power MOSFET switch transistor.

In operation, inductors 250 accumulate energy from the input voltage source $V_S$ when switching transistor 260 is on and releases energy to the output $V_{LOAD}$ through diode 256 and filtered by capacitor 258 when switching transistor 260 is off. The output voltage $V_{LOAD}$ is related to a reference voltage generated or derived from the input voltage $V_S$ and is controlled by varying the duty ratio D of switching transistor 260.

The peak current of inductors 250 is controlled by the operation of power switching control circuit 230 in a discontinuous mode. Controlling the peak current in inductors 250 effectively controls the direct current coming into discontinuous power switching control circuit 230. The peak current in each of inductors 250 is a function of the input voltage ($V_S$), inductance of 250 and "on time" for switch transistor 256 as controlled by the pulse width modulator 254. The amount of time that the pulse width modulator 254 turns on (on time) the switch transistor is dependent on the inductances of 250, operating frequency of PWM 254, the input voltage(s) $V_S$, the output voltage and the output power. The use of separate inductors 250 for each input voltage ($V_S$) enables the forced sharing of power between power sources ($V_{S-1}$ to $V_{S-N}$). Power sources ($V_S$) may be received from one or more different sources. Inductors 250 are valued based on the input voltages $V_{S-1}$ to $V_{S-N}$ to electronic module 100 and the required output voltage $V_{LOAD}$. For example if the input voltages are substantially equal in value then inductors 250 are of equal value to one another.

Figure 3:
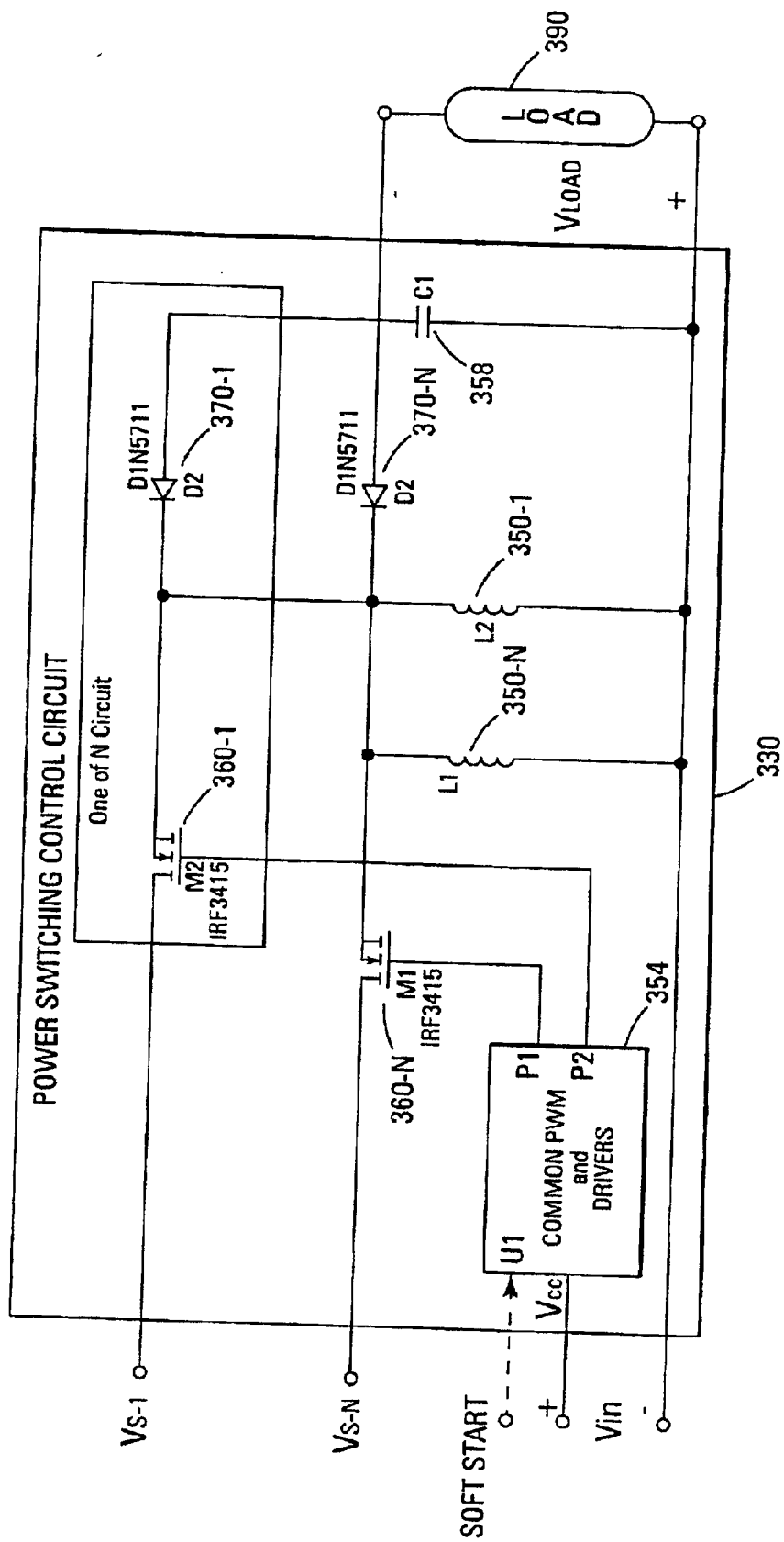
FIG. 3 is a schematic diagram of another embodiment of a power switching control circuit for use in an input power sharing circuit as shown in FIG. 1 according to the teachings of the present invention.

FIG. 3 is a schematic diagram of another embodiment of a power switching control circuit 330 according to the teachings of the present invention. Power switching control circuit 330 is a discontinuous fly back (buck boost) converter and includes multiple inductors 350-1 to 350-N. In one embodiment, inductors 350 are transformers having one or more secondary windings. Inductors 350 are each coupled to switching transistor 360 and diode 370. Power switching control circuit 330 includes a pulse width modulator (PWM) 354 that acts as a switching regulator, regulating the output voltage $V_{LOAD}$. In one embodiment, pulse width modulator is a voltage mode pulse width modulator/controller, a current mode pulse width modulator/controller or the like. In one embodiment, switching transistor 360 is a power MOSFET switch transistor. Switching transistor 360 is coupled to diode 370. In one embodiment, power switching control circuit 330 includes a capacitive filter 358.

The peak current of inductors 350 is controlled by the operation of power switching control circuit 330 in a discontinuous mode. Controlling the peak current in inductors 350 effectively controls the direct current coming into discontinuous power switching control circuit 330. The peak current in each of inductors 350 is a function of the input voltage ($V_{S-N}$), inductance of 350 and "on time" for the pulse width modulator 354. The amount of time that the pulse width modulator 354 turns on (on time) the switch transistor 360 is dependent on the inductances of inductors 350, operating frequency of PWM 354, respectively, the input voltage(s)$V_S$, the output voltage $V_{LOAD}$ and the output power. The use of separate inductors 350 for each input voltage ($V_S$) enables the forced sharing of power between power sources ($V_{S-1}$ to $V_{S-N}$). Power sources ($V_S$) may be received from one or more different sources. Inductors 350 are valued based on the input voltages $V_{S-1}$ to $V_{S-N}$ to electronic module 100 and the required output voltage $V_{LOAD}$. For example if the input voltages are substantially equal in value then inductors 350 are of equal value to one another.

In a basic fly back converter, inductor 350 accumulates energy from the input voltage source $V_S$ when switching transistor 360 is on and releases energy to the output $V_{LOAD}$ through diode 370 and filtered by capacitor 358 when the switching transistor 360 is off. The output voltage $V_{LOAD}$ is related to the input voltage $V_{in}$ and is controlled by varying the duty ratio D of switching transistor 360.

In one embodiment, in operation, input voltages $V_S$ are OR'd together by a power ORing circuit such as 120 of FIG. 1 and provided to pulse width modulator 254, 354. When an input power sharing circuit such as input power sharing circuit 175 of FIG. 1 contains one of power switching control circuits 230, 330 and receives power from two or more voltage input sources $V_S$, current conduction is forced through two or more, respective, inductors 250, 350, simultaneoustly. This simultaneous conduction of current through two or more inductors 250, 350, acting in quasi-parallel, provides the input power sharing control.

Rectifier diode 256 provides a current continuation path when switching transistor 260 is off. Diode 356 provides a current continuation path when switching transistor 360 is off. Inductors 250, 350 and capacitors 258, 358, respectively, in each circuit act as filters and attenuate the switching ripple at the output.

Power switching circuits 230, 330 are each adapted to couple to a load 290, 390, respectively. In one embodiment, a resistor or a combination capacitor and resistor circuit represents loads 290, 390. Loads 290, 390 maybe internal or external to power switching control circuits 230, 330, respectively. The output voltage $V_{LOAD}$ and the impedance of the load 290, 390 control the output power. In one embodiment, load 290, 390 comprises an appropriate functional circuit, e.g. a line card for telecommunications equipment such as a digital subscriber line card. Alternatively, in other embodiments, load 290, 390 comprises any other appropriate electronic circuitry.

Based upon the particular application and the number of input power sources the input power sharing circuit 175 operates as as a conventional discontinuous power converter. When two or more voltage inputs $V_S$ are applied to input power sharing circuit 175 power is supplied by all applied sources. The current in boost inductors 250 is controlled by three variables, the input voltage $V_S$, the boost inductor 250 value, and the switching transistor 260 on time. For power switching control circuit 230, when the input voltages $V_S$ are substantially identical and the inductances of inductors 250 are substantially identical, and since the switching transistor on time must be identical, since it connects to each boost inductor 250, the currents in each boost inductor 250 will be equal. For power switching control circuit 330, the current in inductors 350-1 to 350-N is controlled by the input voltage $V_S$, the value of inductors 350-1 to 350-N, and the switching transistors 360-1 to 360-N, respectively. When the input voltages $V_S$ are substantially identical, the inductances of inductors 350 are substantially identical, and the switching transistors' on time 360 is substantially identical the currents in each inductor 350 will be equal.

In additon, the input power $V_S$ for two sources will decrease to approximately one-half of the single input power level, if the output voltage and power remain constant. Similarily, for three sources the input power from each assembly will be approximately one-third of that for a single input with constant output voltage and power.

In embodiments where the input Voltages $V_{S-1}$ to $V_{S-N}$ are substantially equivalent the output of each filter 140 is connected to separate boost inductors 250 having the same value. Inductors 250 are then coupled to rectifier diode 256 and switching power transistor 260. Discontinous power switching control circuits 230, 330 act as switching power supplies that have multiple inductors 250, 350 on their respective input lines. In embodiments employing power switching control circuit 230 as a discontinuous boost converter the output voltage $V_{LOAD}$ is always higher than the input voltage $V_{in}$. In embodiments employing power switching control circuit 330, a flyback converter the output voltage $V_{LOAD}$ may be less than or greater than the magnitude of the input voltage $V_{in}$.

Figure 4:
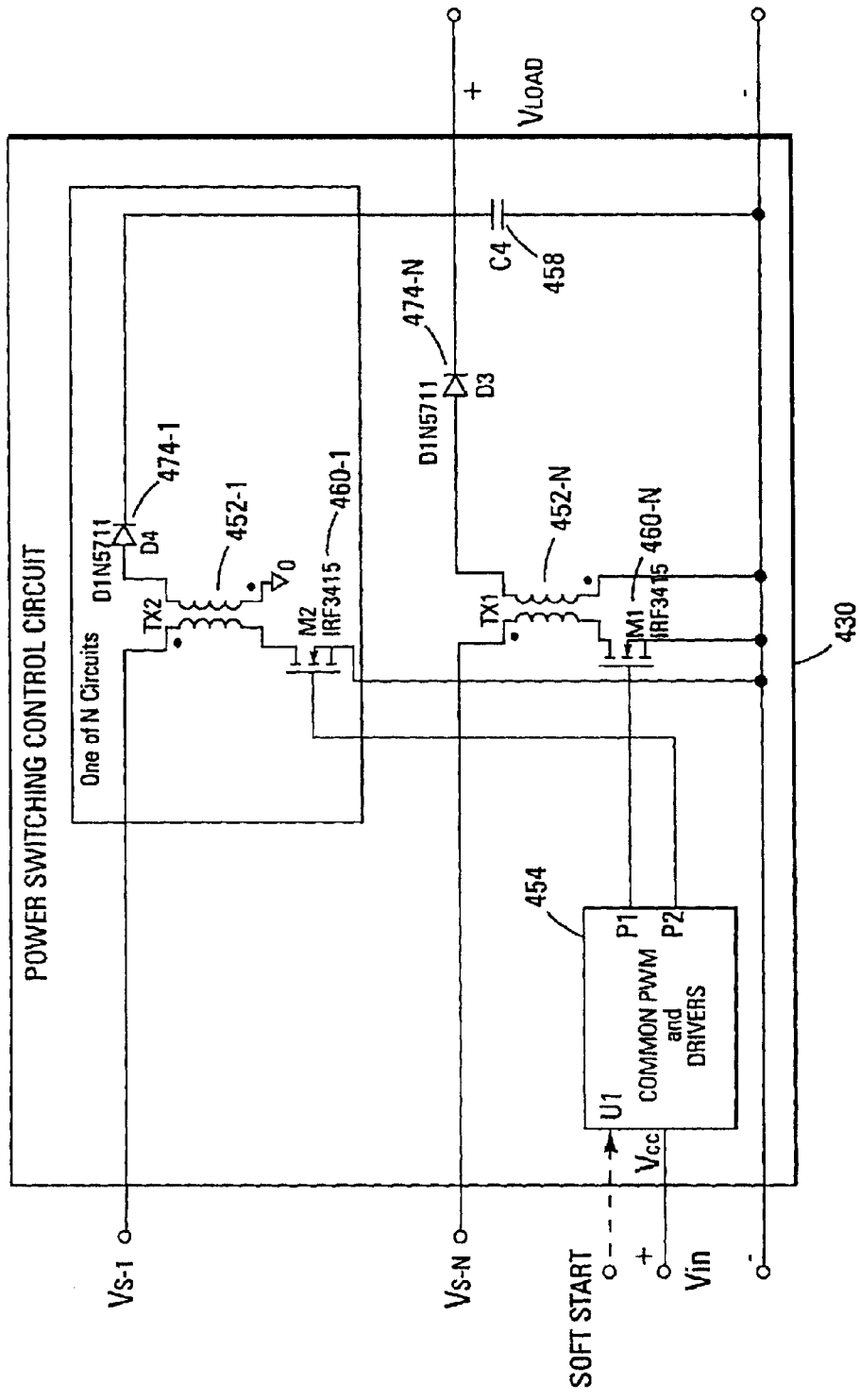
FIG. 4 is a schematic diagram of an alternate embodiment of a power switching control circuit for use in an input power sharing circuit as shown in FIG. 1 according to the teachings of the present invention.
Figure 5:
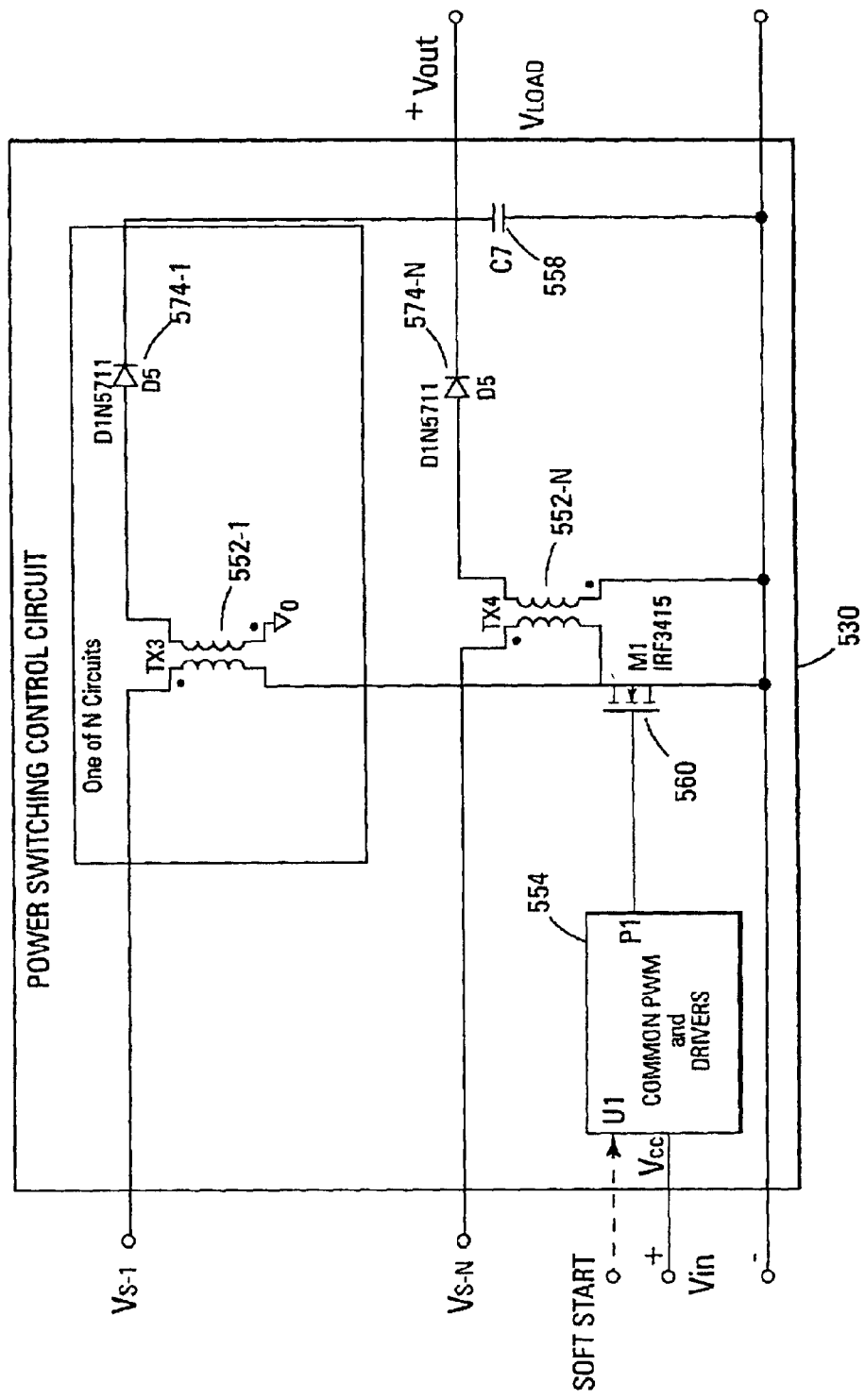
FIG. 5 is a schematic diagram of another embodiment of a power switching control circuit for use in an input power sharing circuit as shown in FIG. 1 according to the teachings of the present invention.

FIGS. 4 and 5 are schematic diagrams of alternate embodiments of power switching control circuit 130 of FIG. 1 according to the teachings of the present invention. The circuits of 230 and 330 have a limitation that these embodiments overcome. Power switching control circuit 230 requires that the output voltage always exceed the input voltage, with the additional constraint that the output voltage is always of the same polarity as the input voltage. Power switching control circuit 330 has the limitation that the output voltage is of the opposite polarity as the input voltage. Its output voltage range is not, however limited in range. The circuits of 430 and 530 use a transformer to overcome these limitations. The output voltage may be either greater or less than the input voltage, and of either polarity. The transformer allows the polarity to change, and also allows for optimization of the power stage based on input an output requirements. For example, a high voltage input with a low voltage output (or vice versa) may create an inefficient circuit or one that is difficult to achieve in practice. Power switching control circuits 430 and 530 are discontinuous fly back converters and each include multiple transformers 452-1 to 452-N and 552-1 to 552-N.

Transformers 452-1 to 452-N are each coupled to switching transistors 460-1 to 460-N, respectively. Power switching control circuit 430 includes a pulse width modulator (PWM) 454 that acts as a switching regulator and controls each switching transistor 460-1 to 460-N, in turn regulating the output voltage $V_{LOAD}$. In one embodiment, pulse width modulator is a voltage mode pulse width modulator/controller, a current mode pulse width modulator/controller or the like. PWM 454 causes the switching of power transistors 460-1 to 460-N at a defined current level in the transformers 452. Transformers 452-1 to 452-N are each coupled to a diode 474-1 to 474-N, respectively. In one embodiment, switching transistors 460 are power MOSFET switch transistors. Power switching control circuit 430 includes a capacitor filter 458.

Power switching control circuit 530 includes transfomers 552-1 to 552-N that are coupled to a single switching transistor 560. Power switching control circuit 530 further includes a pulse width modulator 554 that acts as a switching regulator and controls switching transistor 560, in turn regulating the output voltage $V_{LOAD}$. In one embodiment, pulse width modulator is a voltage mode pulse width modulator/controller, a current mode pulse width modulator/controller or the like. PWM 554 causes the switching of power transistor 560 at a defined current level in transformers 552. Transformers 552-1 to 552-N are each coupled to a diode 474-1 to 474-N, respectively. Power switching control circuit 530 also includes a capacitor filter 558.

The power switching control circuits 330 and 430 each have multiple switching transistors 360 and 460 respectively. This enables multiple phase control and independent current control for each input voltage $V_S$. In one embodiment, this requires N pulse width controllers 354, 454 and additional control circuitry. As a result, this will allow system inputs with large differences in the available input voltage power to share power equally.

In embodiments described with respect to FIG. 3 the output voltage $V_{LOAD}$ is of opposite polarity to the input voltage $V_S$. In the embodiments employing a transformer as found in FIGS. 4 and 5, a positive output voltage is possible with a positive input voltage. It is noted that although FIGS. 2–5 indicate positive input voltages Vs the power switching control circuits 230, 330, 430 and 530 are all capable of receiving negative input voltages. For example, when presented with negative input voltages Vs, power switching control circuit 230 of FIG. 2 will produce a negative output voltage $V_{LOAD}$ whose absolute value is greater than the absolute voltage of the input voltage $V_S$. In addition to the reverse polarity of the input voltage Vs, the polarities of transistor 260 and rectifying diode 256 will also be reversed.

Power switching control circuit 330 is capable of receiving negative input voltages Vs and will produce a positive output voltage $V_{LOAD}$ whose absolute value is greater than, equal to or less than input voltages Vs. The polarities of transistor 360 and diode 370 will also be reversed.

What is claimed is:

1. An input power sharing control circuit, the circuit comprising:
    a plurality of current limiting circuits each circuit adapted to receive power from one of a plurality of independent power sources;
    a power switching control circuit adapted to receive power from the plurality of independent power sources and provide a variable power output; and
    a load coupled to the output of the power switching control circuit, wherein the value of the load impedance and the value of the voltage of the output power controls the variable power output.

2. The control circuit of claim 1, further comprising a plurality of input filter circuits, each circuit adapted to couple to one of the plurality of current limiting circuits.

3. The control circuit of claim 1, wherein the power switching control circuit is adapted to receive a soft start control signal from each of the plurality of current limiting circuits.

4. The control circuit of claim 1, wherein the power switching control circuit is a discontinuous boost converter.

5. The control circuit of claim 1, wherein the power switching control circuit is a discontinuous fly back converter.

6. The control circuit of claim 1, further comprising a power ORing circuit to provide a bias voltage coupled between the plurality of power inputs and the power switching control circuit.

7. The control circuit of claim 4, wherein the variable output power is greater than each of the plurality of independent sources.

8. An input power sharing control circuit, the circuit comprising:
    a plurality of current limiting circuits each circuit adapted to receive a power input from one of a plurality of input power sources, wherein the plurality of input power sources are substantially equal;
    a plurality of input filter circuits, each circuit adapted to couple to one of the plurality of current limiting circuits;
    a power ORing circuit adapted to selectively couple to each of the power inputs;
    a power switching control circuit coupled to each of the plurality of input filters;
    wherein the power switching control circuit is adapted to receive power from the power ORing circuit and provide a variable output power; and
    a load coupled to the output of the power switching control circuit, wherein the value of the load impedance controls the variable output power.

9. The control circuit of claim 8, wherein the variable output power is greater than the value of one of the plurality of input power sources.

10. The control circuit of claim 8, wherein the power switching control circuit is adapted to receive a soft start control signal from each of the plurality of current limiting circuits.

11. The control circuit of claim 8, wherein the power switching control circuit is a discontinuous boost converter.

12. The control circuit of claim 8, wherein the power switching control circuit is a discontinuous fly back converter.

13. An input power sharing control circuit, the circuit comprising:
a plurality of current limiting circuits each circuit adapted to receive a power input from one of a plurality of power input sources;
a plurality of input filter circuits, each circuit adapted to couple to one of the plurality of current limiting circuits;
a power switching control circuit coupled to each of the plurality of input filters,
wherein the power switching control circuit is adapted to receive power from the plurality of input power sources and provide a variable output power; and
a functional circuit coupled to the output of the power switching control circuit, wherein the output power provides power to the functional circuit.

14. The control circuit of claim 13, further comprising a power ORing circuit adapted to selectively couple to each of the input power sources.

15. The control circuit of claim 13, wherein the power switching control circuit is adapted to receive a soft start control signal from each of the plurality of current limiting circuits.

16. The control circuit of claim 13, wherein the power switching control circuit is a discontinuous boost converter.

17. The control circuit of claim 13, wherein the power switching control circuit is a discontinuous fly back converter.

18. The control circuit of claim 13, wherein the variable output power is greater than one of the plurality of power inputs.

19. An input power sharing control circuit, the circuit comprising:
a plurality of current limiting circuits each circuit adapted to receive a voltage input from one of a plurality of input power sources;
a power ORing circuit adapted to selectively couple to each of the input power sources;
a power switching control circuit adapted to receive power from the power ORing circuit and provide a variable output power; and
a functional circuit adapted to receive the variable output power from the power switching control circuit.

20. The control circuit of claim 19, wherein the variable output power is greater than each of the plurality of power inputs.

21. The control circuit of claim 19, further comprising a plurality of input filter circuits, each circuit adapted to couple to one of the plurality of current limiting circuits.

22. The control circuit of claim 19, wherein the power switching control circuit is adapted to receive a soft start control signal from each of the plurality of current limiting circuits.

23. The control circuit of claim 19, wherein the power switching control circuit is a discontinuous boost converter.

24. The control circuit of claim 19, wherein the power switching control circuit is a discontinuous fly back converter.

25. An input power sharing control circuit, the circuit comprising:
a plurality of current limiting circuits each circuit adapted to receive a voltage input from one of a plurality of input power sources;
a plurality of input filter circuits, each circuit adapted to couple to one of the plurality of current limiting circuits;
a power ORing circuit adapted to selectively couple to each of the plurality of input power sources;
a power switching control circuit coupled to each of the plurality of input filters, including:
a pulse width modulator coupled to the power ORing circuit;
a switching transistor coupled to the pulse width modulator;
a diode coupled to the switching transistor;
a plurality of inductors, each inductor coupled to one of the input filter circuits, wherein each of the inductors is substantially equal;
wherein the power switching control circuit is adapted to receive power from the power ORing circuit and provide a variable output power; and
a load coupled to the output of the power switching control circuit, wherein the value of the load controls the variable output power.

26. The control circuit of claim 25, wherein the value of the variable output power is greater than the value of each of the plurality of input power sources.

27. The control circuit of claim 25, wherein the power switching control circuit is adapted to receive a soft start control signal from each of the plurality of current limiting circuits.

28. The control circuit of claim 25, wherein the power switching control circuit is a discontinuous fly back converter.

29. The control circuit of claim 25, wherein the diode is a rectifying diode.

30. The control circuit of claim 25, wherein the power switching control circuit further includes an output filter.

31. The control circuit of claim 25, wherein the output filter is a capacitive circuit.

32. The control circuit of claim 25, wherein the output filter is an RC circuit.

33. The control circuit of claim 25, wherein the load is an internal load.

34. An electronic module, the module comprising:
an input power sharing control circuit, the circuit comprising:
a plurality of current limiting circuits each circuit adapted to receive a voltage input from one of a plurality of substantially equal input power sources;
a power switching control circuit adapted to couple to each of the plurality of input power sources and provide a variable power output; and
a functional circuit coupled to the input power sharing circuit, wherein the output power of the input power sharing circuit powers the functional circuit.

35. The electronic module of claim 34, wherein the variable power output is greater than each of the plurality of power inputs.

36. The electronic module of claim 34, further comprising a plurality of input filter circuits, each circuit adapted to couple to one of the plurality of current limiting circuits.

37. The electronic module of claim 34, further comprising a power ORing circuit adapted to selectively couple between each of the plurality of input power sources and the power switching control circuit.

38. The electronic module of claim 34, wherein the power switching control circuit is adapted to receive a soft start control signal from each of the plurality of current limiting circuits.

39. The electronic module of claim 34, wherein the power switching control circuit is a discontinuous boost converter.

40. The electronic module of claim 34, wherein the power switching control circuit is a discontinuous fly back converter.

41. The electronic module of claim 34, wherein the functional circuit comprises a functional circuit for a telecommunications line card.

42. The electronic module of claim 34, wherein the functional circuit comprises a fan control circuit.

43. A method of input power sharing, comprising:
receiving power from multiple substantially equal input power sources;
sharing the combined power from the multiple input power sources and producing a variable output power;
wherein producing a variable output power comprises:
controlling the current from each of the multiple input power sources;
providing the controlled current to a first source/drain region of a switching transistor; and
regulating the output power by controlling the on time for the switching transistor.

44. The method of claim 43, further comprising producing a variable output power that is greater than each of the multiple input powers.

45. The method of claim 43, wherein controlling the current from each of the multiple input power sources comprises boosting the current from each of the multiple input power sources.

46. The method of claim 43, further comprising:
protecting the power switching control circuit from in rush current; and
limiting the current provided to the power switching control circuit.

47. The method of claim 43, further comprising filtering the power from the multiple input power sources.

48. The method of claim 43, wherein providing the controlled current to a first source/drain region of a switching transistor comprises providing the controlled current to a first source/drain region of a MOSFET switch transistor.

49. A method of input power sharing, comprising:
receiving power from multiple input power sources;
sharing the combined power from the multiple input power sources and producing a variable output power;
wherein producing a variable output power, comprises:
controlling the current from each of the multiple input power sources;
providing the controlled current to a first source/drain region of a switching transistor;
regulating the output power by controlling the on time for the switching transistor based on the controlled current of the multiple input power sources; and
providing the output power to a functional circuit.

50. The method of claim 49, wherein regulating the output power by controlling the on time for the switching transistor based on the controlled current of the multiple input power sources comprises regulating the output power by independently controlling the on time for the switching transistor based on the controlled current for each of the multiple input power sources.

51. The method of claim 49, wherein the variable output power that is greater than the power of each of the multiple input power sources.

52. The method of claim 49, wherein controlling the current from each of the multiple input power sources comprises boosting the current from each of the multiple input power sources.

53. The method of claim 49, further comprising:
protecting the power switching control circuit from in rush current; and
limiting the current provided to the power switching control circuit.

* * * * *